United States Patent Office 3,586,636
Patented June 22, 1971

---

3,586,636
EUROPIUM ACTIVATED VANADATE PHOSPHORS WITH TANTALUM AND/OR NIOBIUM ADDITIVE
Tsuyoshi Kano, Higashimurayama-shi, and Yoshiro Otomo, Mitaka-shi, Japan, assignors to Hitachi, Ltd., Tokyo, Japan
Filed Nov. 25, 1968, Ser. No. 778,700
Claims priority, application Japan, Nov. 27, 1967, 42/75,668
Int. Cl. C09k 1/44
U.S. Cl. 252—301.4R
7 Claims

ABSTRACT OF THE DISCLOSURE

Europium activated yttrium, gadolinium and yttrium-gadolinium vanadate phosphors are doped with Ta, Nb, or either Ta, Nb, or Ta-Nb optionally with Si, and are useful as red color-emitting phosphor for high-pressure mercury lamps.

---

This invention relates to an improved europium activated yttrium and/or gadolinium vanadate phosphor.

Europium activated yttrium and/or gadolinium vanadate phosphor is described, for example, in U.S. Pat. No. 3,243,625, U.S. Pat. No. 3,360,480, and Frank C. Palilla et al.: "Rare Earth Activated Phosphors Based on Yttrium Orthovanadate and Related Compounds," Journal of the Electrochemical Society, vol. 112, pp. 776–779, August 1965.

Vanadate phosphor of such kind is so excellent in color tone, as compared with the heretofore well known oxide phosphor, that it has been used as a red color-emitting phosphor or as a phosphor for high-pressure mercury lamp.

However, said vanadate phosphor is not always sufficient in luminescent intensity as well as coating ability and temperature characteristic, and an improvement of these drawbacks has been heretofore desired.

An object of the present invention is to provide an europium activated yttrium and/or gadolinium vanadate phosphor having an improved luminescent intensity.

Another object of the present invention is to provide an europium activated yttrium and/or gadolinium vanadate phosphor having an improved coating ability.

A further object of the present invention is to provide an europium activated yttrium and/or gadolinium vanadate phosphor having an excellent temperature characteristic.

The improved phosphor of the present invention consists essentially of europium activated yttrium and/or gadolinium vanadate, and contains not more than 0.015 mole of at least one element selected from the group consisting of Ta and Nb per one mole of the formed phosphor.

These phosphors have compositions substantially defined by the following empirical formula:

$$RV_{1-x}M_xO_4:Eu$$

wherein R is designated by $Y_{1-y} Gd_y$ y is variable from 0 to 1; M is at least one element selected from the group consisting of Ta and Nb, and $0 < X \leq 0.015$; and V is vanadium. Advantageously, X is a small but effective amount up to 0.015.

In the present invention, a phosphor having better characteristics can be obtained by further adding 0.004–0.06 mole of silicon to europium activated yttrium and/or gadolinium vanadate together with at least one element selected from the group consisting of Ta and Nb.

These phosphors have compositions substantially defined by the following empirical formula:

$$RV_{1-x}M_xO_4 \cdot ZSiO_2:Eu$$

wherein R is designated by $Y_{1-y} Gd_y$ y is variable from 0 to 1; M is at least one element selected from the group consisting of Ta and Nb, and $0 < X \leq 0.015$; and
$$0.004 \leq Z \leq 0.06$$

Many other characteristics and advantages as well as other objects of the present invention will be made clear by the following detailed explanation as well as by referring to drawings showing preferable embodiments of the present invention.

Figure 1:
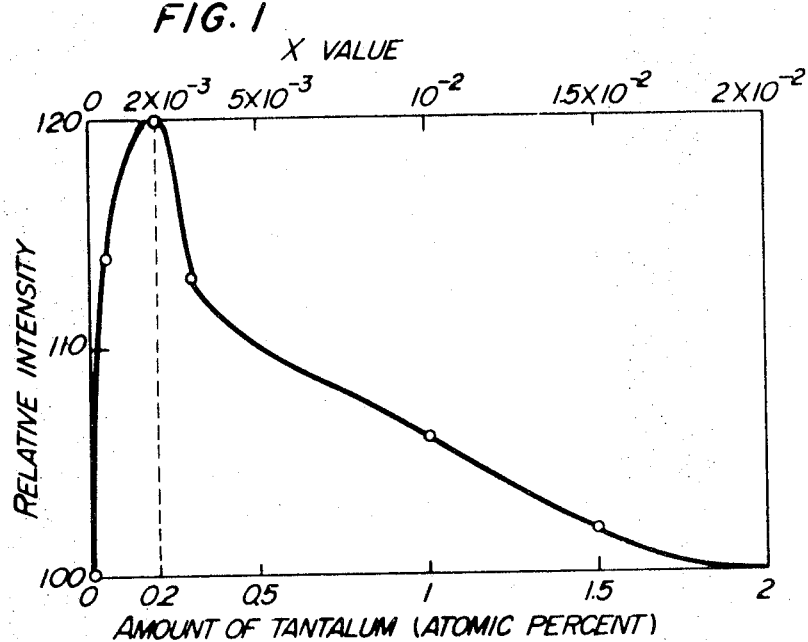
Figure 2:
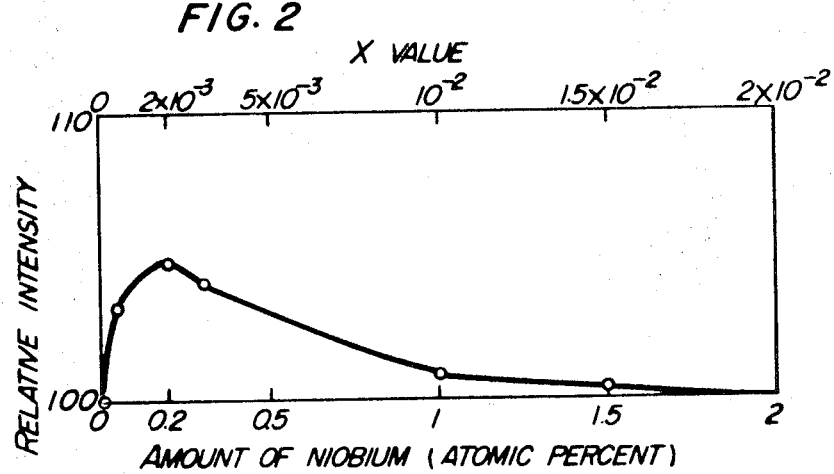
Figure 3:
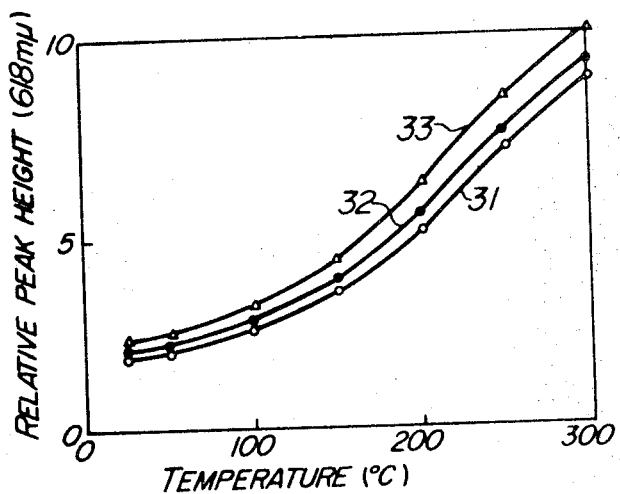

FIG. 1 shows a relative intensity characteristic curve obtained when the europium activated yttrium vanadate is doped with tantalum; FIG. 2 shows a relative intensity characteristic curve obtained when the europium activated yttrium vanadate is likewise doped with niobium; and FIG. 3 shows temperature dependence characteristic curves.

The samples used in obtaining said curves are prepared in the following manner: yttrium oxide, $Y_2O_3$, and europium oxide, $Eu_2O_3$, are dissolved in concentrated $HNO_3$, and ammonium vanadate, $NH_4VO_3$, is dissolved in aqueous ammonia or ammonia water. These solutions are mixed and sufficiently stirred. Europium activated yttrium vanadate precipitate is obtained from said solution mixture as vanadate co-precipitate. The thus obtained precipitate is rinsed with water, filtered off and dried. As starting materials for tantalum and niobium, tantalum pentoxide, $Ta_2O_5$, and niobium pentoxide, $Nb_2O_5$, are used.

As a flux solution, a solution prepared by dissolving sodium carbonate and vanadium pentoxide in distilled water by heating is used.

Said precipitate powder, tantalum pentoxide or niobium pentoxide, and said flux solution are placed in a mortar, pulverized with a pestle and sufficiently mixed.

The thus obtained mixture is dried at 150° C. for one hour, and further fired at 1200° C. in an air atmosphere for two hours.

Water is added to the thus obtained fired product and then the fired product is well mixed in a ball mill, rinsed with water, filtered off and dried, whereby samples are obtained.

The amounts of tantalum and niobium dopants in the samples prepared according to the above procedure are given in column 1 of Tables 1 and 2, respectively. Column 2 of Tables 1 and 2 shows the relative intensity. Further, when these figures are plotted in the drawings, FIGS. 1 and 2 are obtained.

TABLE 1

| | Ta/Y (Atomic ratio) | Relative intensity (under 365 mμ UV excitation) |
|---|---|---|
| Sample No.: | | |
| 1 | 0 | 100 |
| 2 | 5×10⁻⁴ | 114 |
| 3 | 2×10⁻³ | 120 |
| 4 | 3×10⁻³ | 113 |
| 5 | 10⁻² | 106 |
| 6 | 1.5×10⁻² | 102 |
| 7 | 3×10⁻² | 99 |

TABLE 2

| | Nb/Y (Atomic ratio) | Relative intensity (under 365 mμ UV excitation) |
|---|---|---|
| Sample No.: | | |
| 8 | 0 | 100 |
| 9 | 5×10⁻⁴ | 104 |
| 10 | 2×10⁻³ | 106 |
| 11 | 3×10⁻³ | 105 |
| 12 | 10⁻² | 102 |
| 13 | 1.5×10⁻² | 101 |
| 14 | 3×10⁻² | 98 |

All these samples give luminescence having a main peak at 618 mµ when excited with ultraviolet ray (which will be hereinafter referred to merely as "UV").

Measurement of relative intensities shown in these tables and drawings are made for samples set to 25° C., using an ultraviolet ray having a wave length of 365 mµ emitted from a high-pressure mercury lamp as an excitation source.

The intensity values are evaluated with reference to $YVO_4$:Eu, which is doped with neither Ta nor Nb, the intensity of which is taken at 100.

As is evident from these tables and drawings, effects of tantalum and niobium upon improvement of luminescent characteristics of europium activated yttrium vanadate phosphor are remarkable, and even with a very small amount of dopant, a corresponding effect is observed. Further, it is observed that such effect is valid up to an amount of 1.5 atomic percent of dopant.

Either tantalum or niobium shows a maximum effect in an amount of about 0.2 atomic percent.

The amount of dopant of 1.5 atomic percent corresponds to X=0.015 in said empirical formula, and 0.2 atomic percent to X=0.002.

In the present invention, a range of $0 < X \leq 1.5 \times 10^{-2}$ is effective, as stated above, but a range of $$5 \times 10^{-4} \leq X \leq 3 \times 10^{-3}$$

is more preferable.

FIG. 3 shows characteristic curves showing a temperature dependence of the luminescent intensities of phosphor samples based on $YVO_4$:Eu, wherein a curve 31 is for $YVO_4$:Eu; a curve 32 is for $YVO_4$:Eu doped with 0.2 atomic percent Nb; and a curve 33 is for $YVO_4$:Eu doped with 0.2 atomic percent Ta. In FIG. 3, axis of abscissa represents temperatures of samples, and axis of ordinate represents relative peak heights.

The relative peak height is a relative value to the height of the luminescent peak (618 mµ) of luminescent spectra taken as 100 when obtained by exciting the sample of curve 33 in a state heated to 300° C. with UV of 365 mµ. That is, all these samples give luminescence having a main peak at 618 mµ when excited with UV of 365 mµ.

The procedure for preparing these samples are quite the same as in the cases of FIG. 1, FIG. 2, Table 1 and Table 2, as already explained in detail.

It is evident from FIG. 3 that the curves 32 and 33 of the present invention have a desirable temperature dependence.

It is said that the temperature of phosphor layers of high-pressure mercury lamps usually reaches about 250° C., and as the phosphor of the present invention has a good temperature characteristic, brighter luminescence can be obtained from the lamps with the present phosphor than that from the conventional lamp.

All these figures and tables show the cases that the europium activated yttrium vanadate phosphor is used as a sample, but in the present invention, similar result can be obtained from the phosphor in which part or all of yttrium is replaced with gadolinium. Even when the sample is doped with both tantalum and niobium at the same time, a result similar to those as shown in said tables and figures where the sample is doped with either tantalum or niobium singly, can be obtained.

The phosphor of the present invention can be readily prepared according to the well known ordinary process for preparation. That is, oxides or compounds which are easily convertible to oxides by firing are used as starting materials, and these materials are blended at approximately stoichiometrical values, and the resulting mixture may be fired at a temperature of 1100 to 1300° C. for several hours. In another way, for example, an europium activated yttrium and/or gadolinium vanadate powder is prepared according to the co-precipitation method disclosed in U.S. Pat. 3,360,480, and Ta or Nb or both is added to said powder and then the added powder may be fired at said temperature.

Further, it is effective in promoting the firing to add a small amount of alkali metal vanadates, for example, $Na_3VO_4$, $NaVO_3$, $Na_4V_2O_7$, $K_3VO_4$, $KVO_3$ and $K_4V_2O_7$ to a mixture of raw materials for phosphor before firing as a flux.

As raw materials for tantalum and niobium, oxides of these metals may be used, or tantalum compounds and niobium compounds that can be readily converted to oxides by firing, for example, carbonates, oxalates or nitrates of tantalum or niobium, may be used in place of the oxides. Furthermore, it is possible to use powders or particles of Ta or Nb metal as starting materials when the atmosphere at firing is oxygen.

It is confirmed from a result of X-ray fluorescence method that the tantalum or niobium added to the phosphor starting materials are almost quantitatively doped in the phosphor crystal. Tantalum or niobium is supposed to form solid solution with the phosphor crystal by replacing the positions of vanadium, and, bring about a favourable effect upon the luminescent characteristics of the phosphor.

Figure 4:
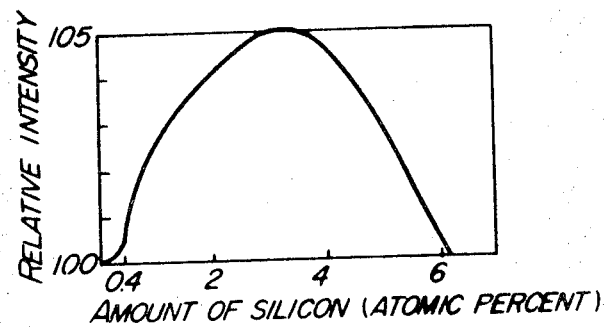

In the foregoing section, the present inventors stated that more favourable result can be obtained by doping with silicon in addition to tantalum and/or niobium. FIG. 4 shows changes in intensity observed when $YVO_4$:Eu doped with 0.2 atomic percent Ta is further doped with Si. For excitation of the phosphor, short wave ultraviolet light is used.

In FIG. 4, axis of ordinate represents a relative intensity to the intensity of a sample having no Si taken as 100, and axis of abscissa represents an amount of Si dopant (shown by atomic percent).

The same process as already shown with reference to said figures and tables is used for preparing the samples for measurement. Si is added to the mixture of starting materials at the same time when doped with tantalum. Water glass is used as a raw material for Si. It is evident from FIG. 4 that a proper amount of Si dopant increases luminescence intensity. 0.4 to 6 atomic percent of Si is effective. In other words, if the amount of Si dopant becomes less than 0.4 atomic percent or more than 6 atomic percent, an effect due to Si dopant is hardly observable, or rather the intensity becomes worse. A maximum effect can be obtained at about 3 atomic percent of Si (Z=0.03).

As regards the amount of Si dopant, 0.4 atomic percent of Si and 6 atomic percent of Si correspond to Z=0.004 and Z=0.06 in said empirical formula, respectively. Accordingly, an effective range of Si dopant is $$0.004 \leq Z \leq 0.06$$

as explained above.

Another effect of Si-doping is to provide fine phosphor particles, bringing about a favourable effect when a pipe or tube is coated with the phosphor. That is, a coating ability of the phosphor is considerably improved.

As raw materials for Si dopant, $SiO_2$ particles or silicates such as water glass or organosilanes such as $Si(OC_2H_5)_4$, which are readily convertible to oxides by firing, are used.

It is likewise confirmed from a result of chemical analysis that Si is incorporated in the phosphor crystal as well as Ta or Nb.

These Ta, Nb and Si dopants in the europium activated yttrium and/or gadolinium vanadate phosphor do not give any unfavourable influence to the lmuinescent color tone of the phosphor, but can considerably improve the intensity, temperature characteristic and coating ability of the phosphor.

EXAMPLE 1

214.6 g. of yttrium oxide, $Y_2O_3$, and 17.6 g. of europium oxide, $Eu_2O_3$, were dissolved in 570 ml. of concentrated $HNO_3$, and the resulting solution was diluted to one liter with distilled water.

32 ml. of a 28 percent ammonia water was diluted to 2 liters with distilled water and heated to 70° C. Then, 23.4 g. of ammonium vanadate, $NH_4VO_3$ was dissolved in said heated solution. To said ammonium vanadate solution was added 100 ml. of the mixture of yttrium nitrate and europium nitrate solution prepared beforehand, and the solution was sufficiently stirred, whereby co-precipitates of yttrium vanadate and europium vanadate were obtained.

The co-precipitates were rinsed with water, filtered off and dried at 250° C. for 24 hours, whereby dry precipitate powders were obtained.

Further, 63.3 g. of sodium carbonate, $Na_2CO_3$, and 54.5 g. of vanadium pentoxide, $V_2O_5$, were dissolved in 600 ml. of distilled water as a flux solution by heating.

70 g. of said dry precipitates, 0.075 g. of tantalum pentoxide, $Ta_2O_5$ and 32 ml. of flux solution were placed in a mortar, and the mixture was pulverized and mixed with a pestle. The mixture was dried at 150° C. for one hour and further fired at 1200° C. in air for 2 hours.

Water was added to the thus obtained fired product and the mixture was sufficiently milled in a ball mill, rinsed, filtered off and dried, whereby europium activated yttrium vanadate phosphor with 0.1 atomic percent Ta was obtained. That is, X of the phosphor was $10^{-3}$. When the luminescent intensity of the thus obtained phosphor was compared with that of the phosphor without tantalum under 365 m$\mu$. UV excitation, 16% increase of luminescence intensity was observed.

EXAMPLE 2

In place of tantalum pentoxide, $Ta_2O_5$, used in Example 1, 0.045 g. of niobium pentoxide was used, and europium activated yttrium vanadate phosphor doped with 0.1 atomic percent Nb was obtained according to the same procedure as in Example 1. That is, X of the phosphor was $10^{-3}$. When the luminescent intensity of the thus obtained phosphor was compared with that of the phosphor without niobium under 365 m$\mu$ UV excitation, 5% increase of luminescence intensity was observed.

EXAMPLE 3

70 g. of the dry precipitates obtained in Example 1, 0.075 g. of tantalum pentoxide, $Ta_2O_5$, 32 ml. of flux solution used in Example 1, and 2 ml. of water glass (specific gravity: 1.23) containing 20% silicon dioxide were placed in a mortar, and sufficiently pulverized and mixed with a pestle. The resulting mixture was dried at 150° C. for 24 hours, and the thus obtained dry powders were fired according to the same procedure as in Example 1, whereby europium activated yttrium vanadate phosphor doped with 0.1 atomic percent Ta and 0.8 atomic percent Si was obtained. That is, X and Z of the phosphor were $10^{-3}$ and $8 \times 10^{-3}$ respectively. When the luminescence intensity of thus obtained phosphor was compared with that of the phosphor of Example 1 (without Si) under 365 m$\mu$. UV excitation, 2% increase of luminesence intensity was observed. When the shapes of the phosphor crystals were compared with each other, it was observed that more five phosphor was obtained than in Example 1, and the effectiveness of Si dopant was recognized.

EXAMPLE 4

In place of 0.075 g. of tantalum of Example 1, 0.038 g. of tantalum pentoxide, $Ta_2O_5$ and 0.023 g. of niobium pentoxide were used, and europium activated yttrium vanadate phosphor doped with 0.05 atomic percent Ta and 0.05 atomic percent Nb was obtained. That is, X of the phosphor was $10^{-3}$. When the luminescence intensity of the thus obtained phosphor was compared with that of the phosphor containing neither tantalum nor niobium under 365 m$\mu$ UV excitation, 13% increase of luminescence intensity was observed.

EXAMPLE 5

In place of 0.075 g. of tantalum pentoxide, $Ta_2O_5$, of Example 1, 0.75 g. thereof was used, and $YVO_4$:Eu phosphor doped with 1 atomic percent Ta was obtained according to the same procedure as in Example 1. That is, X of the phosphor was $10^{-2}$. When the luminescence intensity of the thus obtained phosphor was compared with that of the phosphor without tantalum under 365 m$\mu$ UV excitation, 6% increase of luminescence intensity was observed.

EXAMPLE 6

In place of 0.045 g. of niobium pentoxide, $Nb_2O_5$, of Example 2, 0.45 g. thereof was used, and $YVO_4$:Eu doped with 1 atomic percent Nb was obtained according to the same procedure as in Example 2. That is, X of the phosphor was $10^{-2}$. When the luminescence intensity of the phosphor was compared with that of the phosphor without niobium under 365 m$\mu$ UV excitation, 1% increase of luminescence intensity was observed.

EXAMPLE 7

In place of 214.6 g. of yttrium oxide, $Y_2O_3$, of Example 1, 344.4 g. of gadolinium oxide, $Gd_2O_3$ was used, and $GdVO_4$:Eu phosphor doped with 0.1 atomic percent Ta was obtained according to the same procedure as in Example 1. When the luminescence intensity of the thus obtained phosphor was compared with that of the phosphor without tantalum, it was observed that the effect of tantalum was as good as that in Example 1.

EXAMPLE 8

In place of 214.6 g. of yttrium oxide, $Y_2O_3$, of Example 1, 334.4 g. of gadolinium oxide, $Gd_2O_3$ was used. Further, in place of 0.075 g. of tantalum pentoxide, 0.045 g. of niobium pentoxide was used, and $GdVO_4$:Eu phosphor doped with 0.1 atomic percent Nb was obtained according to the same procedure as in Example 1. When the intensity of the thus obtained phosphor was compared with that of the phosphor without niobium, it was observed that the effect of niobium was as good as that in Example 2.

EXAMPLE 9

In place of 214.6 g. of yttrium oxide, $Y_2O_3$, of Example 1, 344.4 g. of gadolinium oxide was used, and $GdVO_4$:Eu phosphor doped with 0.05 atomic percent Ta and 0.05 atomic percent Nb was obtained according to the same procedure as in Example 4. When the luminescence intensity of the thus obtained product was compared with that of the phosphor containing neither tantalum nor niobium, it was observed that the effect of tantalum and niobium was as good as that in Example 4.

EXAMPLE 10

In place of 214.6 g. of yttrium oxide of Example 1, 180.6 g. of yttrium oxide and 54.4 g. of gadolinium oxide were used, and $Y_{0.84}Gd_{0.16}VO_4$:Eu phosphor doped with 0.1 atomic percent Ta was obtained according to the same procedure as in Example 1. When the luminescence intensity of the thus obtained product was compared with that of the phosphor without tantalum, it was observed that the effect of tantalum was as good as that of Example 1.

EXAMPLE 11

In place of 214.6 g. of yttrium oxide, $Y_2O_3$, of Example 1, 180.6 g. of yttrium oxide and 54.4 g. of gadolinium oxide were used. Further, in place of 0.075 g. of tantalum pentoxide, 0.045 g. of niobium pentoxide was used, and $Y_{0.84}Gd_{0.16}VO_4$:Eu phosphor doped with 0.1 atomic percent Nb was obtained according to the same procedure as in Example 1. When the luminescence intensity of the thus obtained phosphor was compared with that of the phosphor withou niobium, 5% increase of luminescence intensity was observed.

EXAMPLE 12

In place of 214.6 g. of yttrium oxide, $Y_2O_3$, of Example 1, 180.6 g. of yttrium oxide and 54.4 g. of gadolinium oxide were used, and europium activated yttrium-gadolinium vanadate phosphor doped with tantalum and niobium was obtained according to the same procedure as in Example 4. When the luminescence intensity of the thus obtained phosphor was compared with that of the phosphor containing neither tantalum nor niobium, 13% increase of luminescence intensity was observed.

EXAMPLE 13

70 g. of dry precipitates obtained in Example 1, 0.045 g. of niobium pentoxide, $Nb_2O_5$, 32 ml. of flux solution used in Example 1, and 2 ml. of water glass were placed in a mortar and sufficiently pulverized with a pestle. Then, $YVO_4$:Eu phosphor doped with 0.1 atomic percent Nb and 0.8 atomic percent Si was obtained according to the same procedure as in Example 3. When the luminescence intensity of the thus obtained phosphor was compared with that of the phosphor without Si of Example 2, 2% increase of luminescence intensity was observed.

EXAMPLE 14

A mixture of 0.48 mole of yttrium oxide, $Y_2O_3$, 0.48 mole of gadolinium oxide, $Gd_2O_3$, 0.05 mole of europium oxide, $Eu_2O_3$, 0.998 mole of vanadium pentoxide, $V_2O_5$, 0.001 mole of tantalum pentoxide, $Ta_2O_5$, 0.001 mole of niobium pentoxide, $Nb_2O_5$, and 0.01 mole of silicon dioxide was sufficiently pulverized and mixed, and fired at 800° C. for 2 hours. To the fired product was added 0.05 mole of sodium vanadate, $NaVO_3$, as a flux, and then the mixture was pulverized, mixed, and fired at 1250° C. in an oxygen atmosphere for 2 hours, whereby europium activated yttrium-gadolinium vanadate phosphor doped with tantalum, niobium and silicon was obtained. When the luminescence intensity of the thus obtained phosphor was compared with that of the phosphor , 3% increase of luminescence intensity was observed. The phosphor was in a fine crystalline form and had a good coating ability.

We claim:

1. A phosphor consisting essentially of a europium activated vanadate of at least one metal selected from the group consisting of yttrium and gadolinium, said vanadate having the formula, $RX_{1-x}M_xO_4$:Eu, wherein R is designated by $Y_{1-y}Gd_y$ and $y$ is variable from 0 to 1; M is at least one element selected from the group consisting of Ta and Nb; and $0<X\leq0.015$, X being sufficiently above 0 to produce enhanced luminescence.

2. A phosphor consisting essentially of a europium activated vanadate of at least one metal selected from the group consisting of yttrium and gadolinium, said vanadate having the formula, $RV_{1-x}M_xO_4$:Eu, wherein R is designated by $Y_{1-y}Gd_y$ and $y$ is variable from 0 to 1; M is at least one element selected from the group consisting of Ta and Nb; and $5\times10^{-4}\leq Z\leq0.06$.

3. A phosphor consisting essentially of a europium activated vanadate of at least one metal selected from the group consisting of yttrium and gadolinium, doped with silicon, said vanadate having the formula, $RV_{1-x}M_xO_4 \cdot ZSiO_2$:Eu, wherein R is designated by $Y_{1-y}Gd_y$ and $y$ is variable from 0 to 1; M is at least one element selected from the group consisting of Ta and Nb, and $0<X\leq0.015$, X being sufficiently above 0 to produce enhanced luminescence; and $0.004\leq Z\leq0.06$.

4. A phosphor consisting essentially of a europium activated vanadate of at least one metal selected from the group consisting of yttrium and gadolinium, doped with silicon, said vanadate having the formula, $$RV_{1-x}M_xO_4 \cdot ZSiO_2:Eu,$$

wherein R is designated by $Y_{1-y}Gd_y$ and $y$ is variable from 0 to 1; M is at least one element selected from the group consisting of Ta and Nb, and $$5\times10^{-4}\leq X\leq3\times10^{-3}; \text{ and } 0.004\leq Z\leq0.06.$$

5. A phosphor consisting essentially of a europium activated vanadate of at least one metal selected from the group consisting of yttrium and gadolinium, doped with approximately 0.2 atomic percent of at least one element selected from the group consisting of tantalum and niobium.

6. A phosphor consisting essentially of a europium activated vanadate of at least one metal selected from the group consisting of yttrium and gadolinium, doped with approximately 0.2 atomic percent of at least one element selected from the group consisting of tantalum and niobium, and approximately 3 atomic percent of silicon.

7. The phosphor of claim 1, wherein $0.0005\leq X\leq0.015$.

References Cited

UNITED STATES PATENTS

| | | | |
|---|---|---|---|
| 3,368,980 | 2/1968 | Avella et al. | 252—301.4 |
| 3,502,591 | 3/1970 | Kano et al. | 252—301.4 |

ROBERT D. EDMONDS, Primary Examiner